(12) United States Patent
Choi

(10) Patent No.: US 7,464,500 B2
(45) Date of Patent: Dec. 16, 2008

(54) MOVING WIRING SYSTEM FOR VEHICLE

(75) Inventor: Jae Hong Choi, Gwangmyeong (KR)

(73) Assignee: Kia Motors Company, Seoul (KR)

( * ) Notice: Subject to any disclaimer, the term of this patent is extended or adjusted under 35 U.S.C. 154(b) by 0 days.

(21) Appl. No.: 11/299,354

(22) Filed: Dec. 8, 2005

(65) Prior Publication Data
US 2007/0125001 A1    Jun. 7, 2007

(30) Foreign Application Priority Data
Dec. 7, 2005    (KR) .................... 10-2005-0118803

(51) Int. Cl.
*E05F 11/54* (2006.01)
(52) U.S. Cl. ..................... 49/360; 296/146.1
(58) Field of Classification Search ................ 49/360; 296/155, 146.1
See application file for complete search history.

(56) References Cited

U.S. PATENT DOCUMENTS

| | | | |
|---|---|---|---|
| 6,321,489 B1 * | 11/2001 | Murofushi et al. ............. | 49/360 |
| 6,682,353 B2 * | 1/2004 | Bigotto ........................ | 439/34 |
| 6,700,064 B2 | 3/2004 | Aoki et al. | |
| 6,781,058 B1 * | 8/2004 | DeCicco et al. ........... | 174/72 A |
| 6,787,702 B2 * | 9/2004 | Suzuki ..................... | 174/72 A |
| 6,793,259 B2 | 9/2004 | Sano et al. | |
| 6,881,902 B2 * | 4/2005 | Aoki et al. ................. | 174/72 A |
| 2002/0005014 A1 * | 1/2002 | Doshita et al. ................ | 49/360 |
| 2003/0184118 A1 * | 10/2003 | Sano et al. ................... | 296/155 |
| 2005/0264033 A1 * | 12/2005 | Aoki et al. ................. | 296/155 |
| 2006/0170244 A1 * | 8/2006 | Blase ......................... | 296/155 |

FOREIGN PATENT DOCUMENTS

| | | |
|---|---|---|
| DE | 10118205 A1 | 10/2001 |
| JP | 2004-001673 | 1/2004 |
| KR | 20-0398980 | 10/2005 |

* cited by examiner

*Primary Examiner*—Gregory J. Strimbu
(74) *Attorney, Agent, or Firm*—Morgan, Lewis & Bockius LLP

(57) ABSTRACT

A moving wiring system transmitting electrical power from a vehicle body of a vehicle to a sliding door includes a wire transmitting the electrical power, a wire housing attached to the sliding door with at least one portion of the wire located therein, and a wire guide assembly attached to the vehicle body and guiding the wire. The wire housing defines a space in which at least one portion of the wire is movably located. The wire guide assembly includes a first guiding portion attached to the vehicle body and guiding the wire, a second guiding portion rotatably and perpendicularly coupled to the first guiding portion, and a third guiding portion attached to an end of the second guiding portion and guiding the wire to the wire housing. The third guiding portion includes an elastic member supporting the wire.

4 Claims, 9 Drawing Sheets

MOVING WIRING SYSTEM FOR VEHICLE

CROSS-REFERENCE TO RELATED APPLICATION

This application claims priority to and the benefit of Korean Patent Application No. 10-2005-0118803 filed in the Korean Intellectual Property Office on Dec. 07, 2005, the entire contents of which are incorporated herein by reference.

BACKGROUND OF THE INVENTION (a) Field of the Invention

The present invention relates to a moving wiring system. More particularly, the present invention relates to a moving wiring system where a wire is not exposed outside.

(b) Description of the Related Art

Generally, a moving wiring system of a vehicle transmits an electrical power from a vehicle body to a sliding door of the vehicle.

The sliding door is movably coupled to the vehicle body and a wire is disposed between the vehicle body and the door for supplying electrical power to the door.

That is, because the sliding door is movably coupled to the vehicle body, the wire has to move corresponding to the movement of the sliding door.

Therefore, the wire moves when the sliding door moves.

However, according to a moving wiring system of the prior art, a problem occurs that the wire is easily broken because the wire is exposed outside.

In addition, according to the moving wiring system of the prior art, problems occur that noise occurs when the door operates and that durability is weak.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a moving wiring system having advantages of reducing damage to a wire and noise.

An exemplary moving wiring system transmitting electrical power from a vehicle body of a vehicle to a sliding door according to an embodiment of the present invention includes a wire transmitting the electrical power, a wire housing disposed to the sliding door with at least one portion of the wire located therein corresponding to an opening and closing of the sliding door, and a wire guide assembly disposed to the vehicle body and guiding the wire corresponding to the opening and closing of the sliding door.

The wire housing defines a space in which at least one portion of the wire is variably located corresponding to the guiding of the wire.

The wire guide assembly includes a first guiding portion disposed to the vehicle body and guiding the wire, a second guiding portion rotatably and perpendicularly coupled to the first guiding portion, and a third guiding portion disposed to an end of the second guiding portion and guiding the wire to the wire housing.

The third guiding portion includes an elastic member supporting the wire corresponding to the opening and closing of the sliding door.

BRIEF DESCRIPTION OF THE DRAWINGS

FIG. 8 shows an operation of the wire guide assembly according to the exemplary embodiment of the present invention.

DESCRIPTION OF REFERENCE NUMERALS INDICATING PRIMARY ELEMENTS IN THE DRAWINGS

Figure 1:
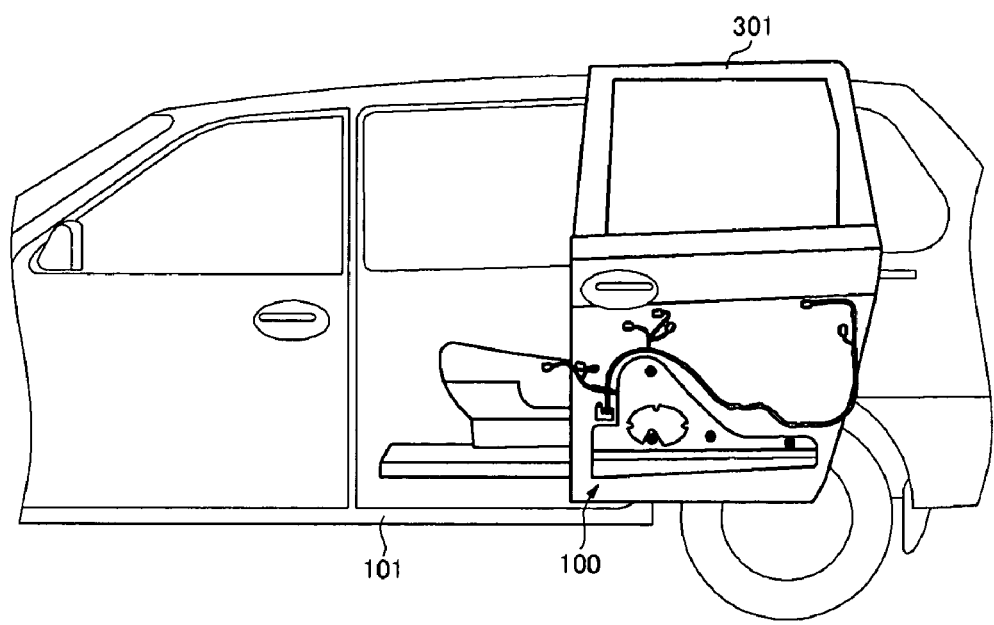
FIG. 1 shows a shape of a moving wiring system that is mounted to a vehicle according to an exemplary embodiment of the present invention.

100: moving wiring system
201: wire
200: wire guide assembly
301: sliding door
300: wire housing
400: space
501: inner panel
900: elastic member

DETAILED DESCRIPTION OF THE EXEMPLARY EMBODIMENT

An exemplary embodiment of the present invention will hereinafter be described in detail with reference to the accompanying drawings.

Figure 2:
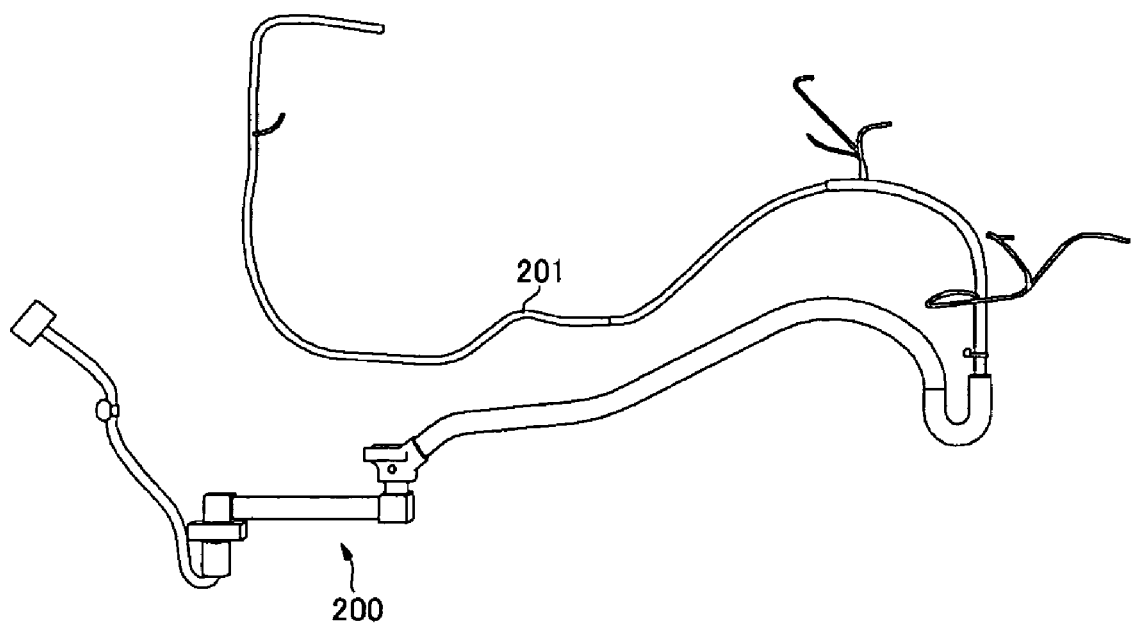
FIG. 2 shows a wire and a wire guide assembly according to the exemplary embodiment of the present invention.
Figure 3:
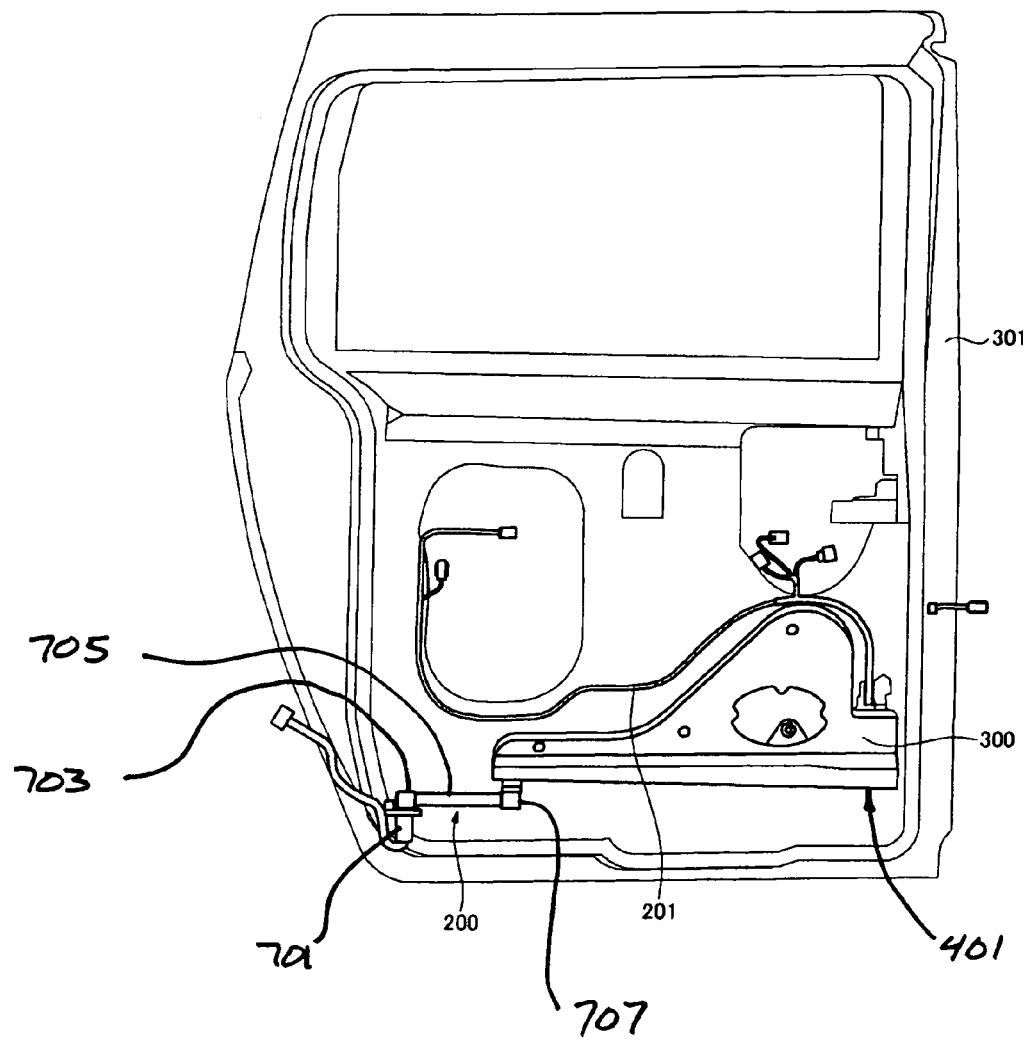
FIG. 3 shows a shape of a wire housing mounted to a sliding door of a vehicle according to the exemplary embodiment of the present invention.

FIG. 1 shows a shape of a moving wiring system that is mounted to a vehicle according to the exemplary embodiment of the present invention, FIG. 2 shows a wire and a wire guide assembly according to the exemplary embodiment of the present invention, and FIG. 3 shows a shape of a wire housing that is mounted to a sliding door of a vehicle according to the exemplary embodiment of the present invention.

As shown in FIG. 1 to FIG. 3, according to the exemplary embodiment of the present invention, a moving wiring system 100 transmitting electrical power from a vehicle body 101 of a vehicle to a sliding door 301 includes a wire 201, a wire housing 300, and a wire guide assembly 200.

The wire 201 transmits electrical power from the vehicle body 101 to the sliding door 301, and the wire housing 300 is disposed to the sliding door 301, with at least one portion of the wire 201 located therein, corresponding to an opening and closing of the sliding door 301.

The wire guide assembly 200 is disposed to the vehicle body 101 and guides the wire 201 corresponding to the opening and closing of the sliding door 301.

As shown in FIG. 1, electrical power is transmitted from the vehicle body 101 through the wire 201.

Referring to FIG. 2 and FIG. 3, the wire 201 and the wire housing 300 is located in the sliding door 301, and actuators (not shown), to which the electrical power is transmitted, are connected to respective ends of the wire 201.

Therefore, electrical power is transmitted from a battery of the vehicle body 101 to the sliding door 301 through the wire 201.

Figure 4:
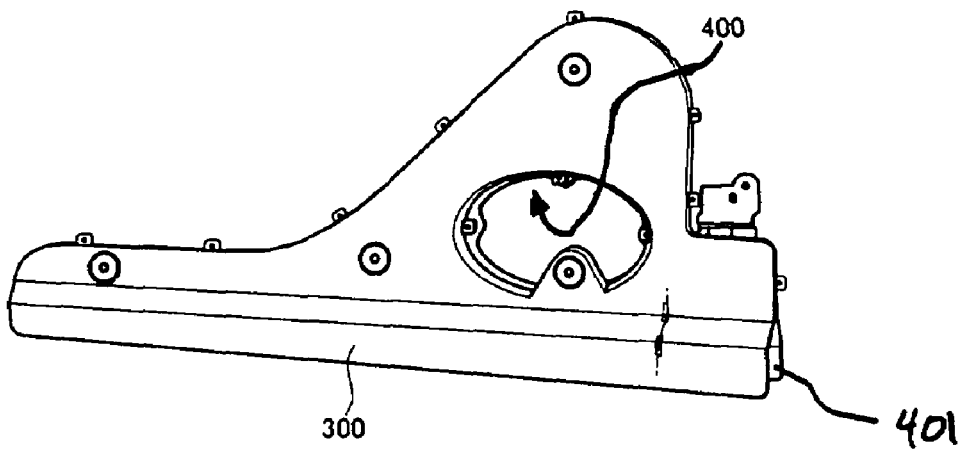
FIG. 4 shows the wire housing according to the exemplary embodiment of the present invention.
Figure 5:
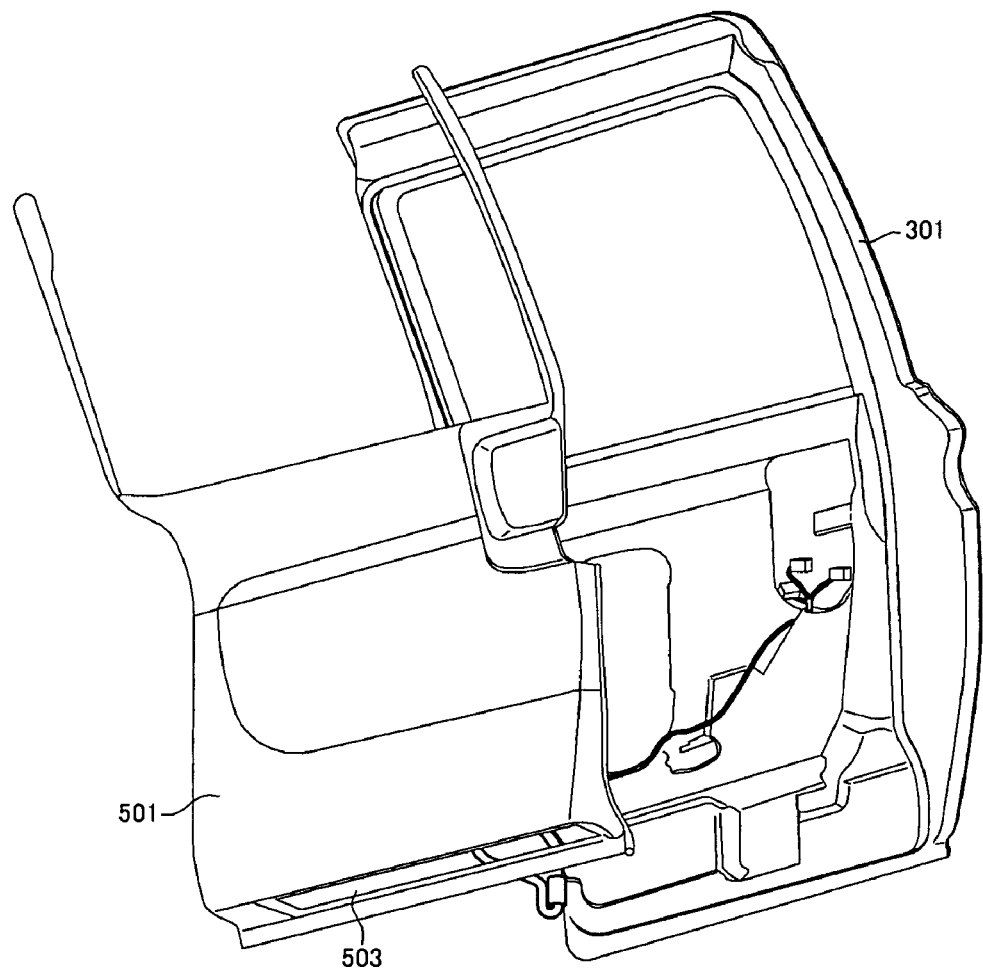
FIG. 5 shows an inner panel of the door to which the wire is mounted according to the exemplary embodiment of the present invention.
Figure 6:
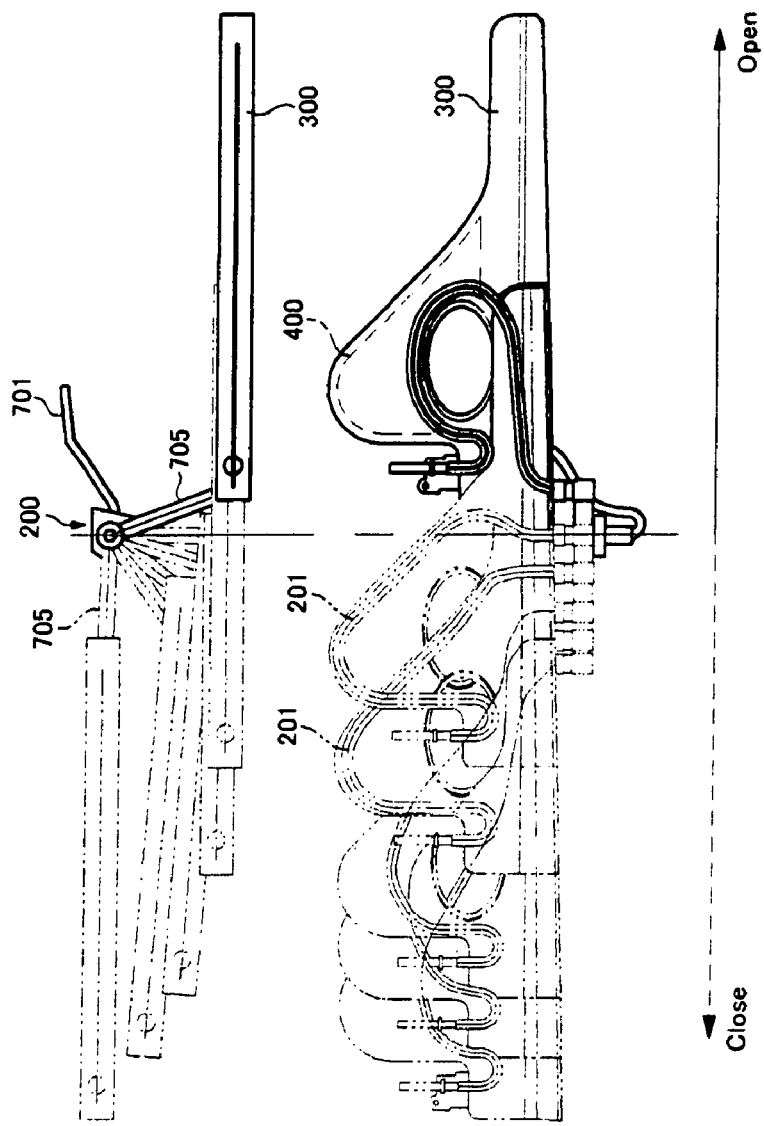
FIG. 6 shows an operation of a moving wiring system according to the exemplary embodiment of the present invention.

FIG. 4 shows the wire housing according to the exemplary embodiment of the present invention, FIG. 5 shows an inner panel of the door to which the wire is mounted according to the exemplary embodiment of the present invention, and FIG. 6 shows an operation of a moving wiring system according to the exemplary embodiment of the present invention.

The wire housing 300 defines a space 400 in which at least one portion of the wire 201 is variably located corresponding to the guiding of the wire 201. An open channel 401 is formed along the bottom of wire housing 300.

That is, if the sliding door 301 moves, a shape of the portion of the wire 201 which is located between the sliding door 301 and the vehicle body 101 is changed because both ends of the wire 201 are secured to the vehicle body 101 and the sliding door 301 respectively.

Therefore, the words "close" and "open" shown in FIG. 6 refer to the closing and opening of the sliding door 301.

That is, as shown in FIG. 6, the shape of the portion of the wire 201 located in the space 400 of the wire housing 300 is changed corresponding to the movement of the sliding door 301.

The dotted-line arrow shown in FIG. 6 illustrates a state that the sliding door 301 is closed and the solid-line arrow illustrates a state that the sliding door 301 is opened.

The wire 201 is located to the space 400 of the wire housing 300 in a state where the wire is uncurled when the sliding door 301 is closed.

In addition, the wire 201 is located to the space 400 of the wire housing 300 in a state where the wire is curled when the sliding door 301 is opened.

Referring to FIG. 5, according to an exemplary embodiment of the present invention, a hole 503 is formed to an inner panel 501 of the sliding door 301 such that the wire 201 is connected to the sliding door 301.

Figure 7:
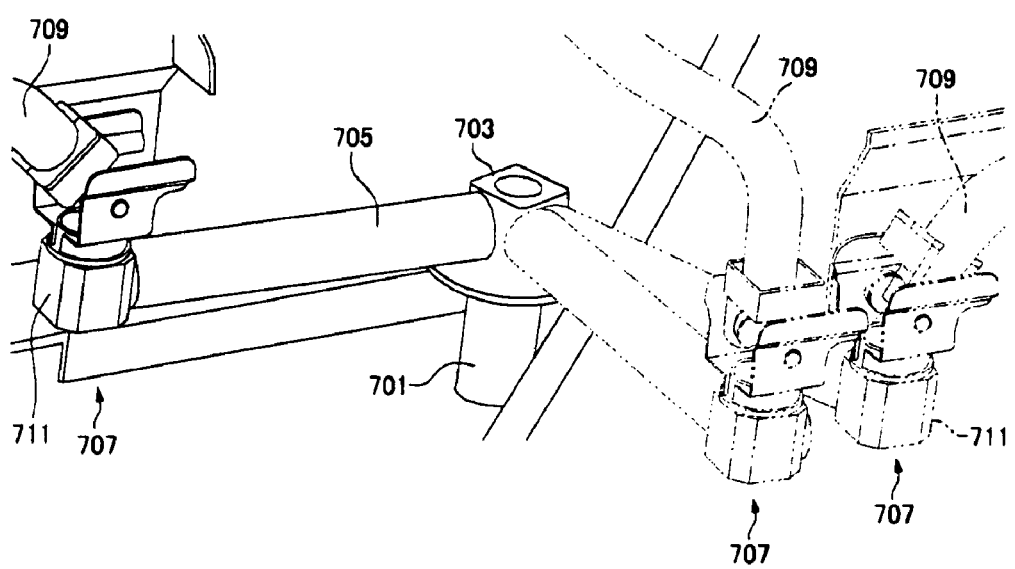
FIG. 7 and FIG. 8 show operation of the wire guide assembly in three positions according to the exemplary embodiment of the present invention.
Figure 8:
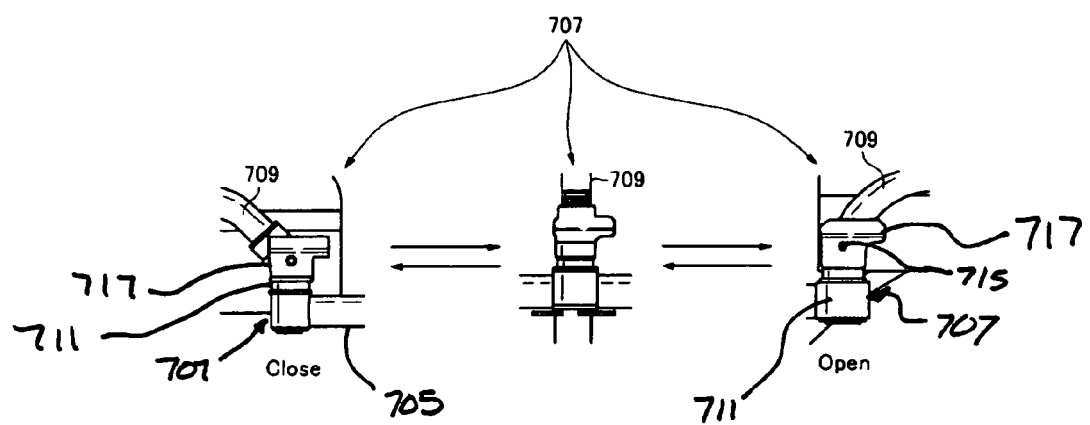

FIG. 7 and FIG. 8 show an operation of the wire guide assembly according to the exemplary embodiment of the present invention.

Referring to FIG. 7 and FIG. 8, the wire guide assembly 200 includes a first guiding portion 701, a second guiding portion 705, and a third guiding portion 707.

The first guiding portion 701 is disposed to the vehicle body 101 and guides the wire 201, and the second guiding portion 705 is rotatably and perpendicularly coupled to the first guiding portion 701.

The third guiding portion 707 is disposed to an end of the second guiding portion 705 and guides the wire to the wire housing 300.

That is, the wire 201 is located in inner portions of the first, second, and third guiding portions 701, 705, and 707.

The wire 201 sequentially passes through the first guiding portion 701, a first rotating portion 703, and the second guiding portion 705 and is guided to the wire housing 300 through the third guiding portion 707.

More particularly, the wire 201 is guided to the wire housing 300 by a hollow member such as a tube 709 connected to the third guiding portion 707.

The first rotating portion 703 connects the first guiding portion 701 with the second guiding portion 705 such that the second guiding portion 705 can rotate with respect to the first guiding portion 701.

That is, as shown in FIG. 6, the second guiding portion 705 rotates corresponding to the opening and closing of the sliding door 301.

The third guiding portion 707 is rotatably coupled to the second guiding portion 705 corresponding to the opening and closing of the sliding door 301.

In other words, the third guiding portion 707 is rotatably coupled to the second guiding portion 705 by a second rotating portion 711.

According to the exemplary embodiment of the present invention, because the wire 201 is guided by the first, second, and third guiding portions 701, 705, and 707, the first rotating portion 703, and the second rotating portion 711, noise can be prevented when the moving wiring system 100 operates and damage to the wire 201 can be prevented.

Figure 9:
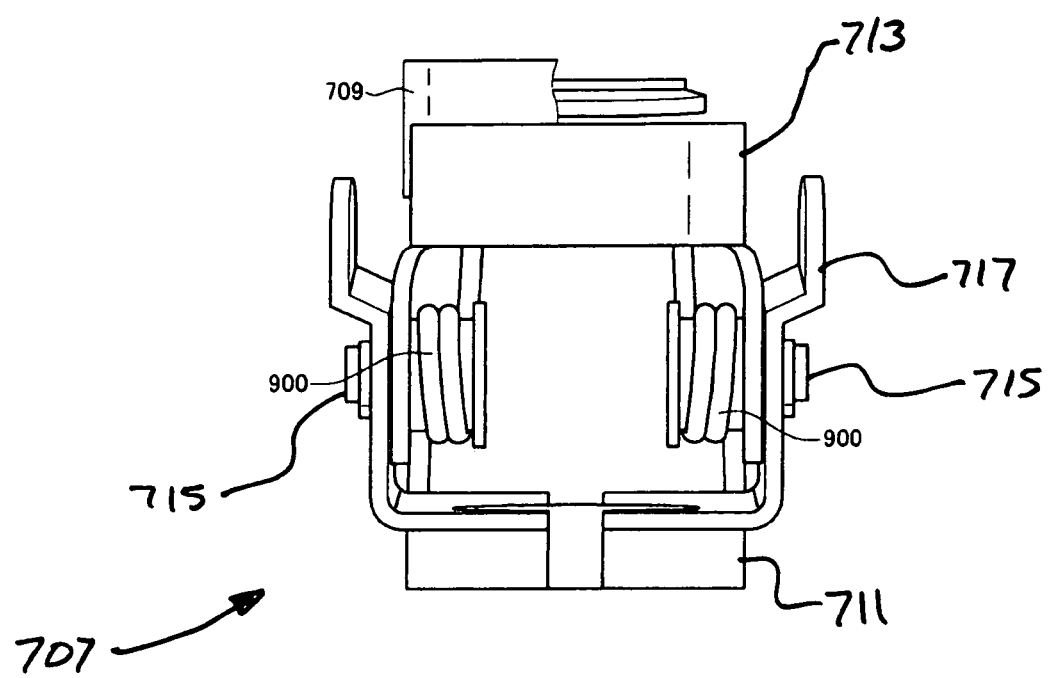
FIG. 9 shows an elastic member according to the exemplary embodiment of the present invention.

FIG. 9 shows an elastic member according to the exemplary embodiment of the present invention.

The third guiding portion 707 includes an elastic member 900 supporting the wire 201 corresponding to the opening and closing of the sliding door 301.

That is referring to FIG. 6, FIG. 8, and FIG. 9, the tube 709 connected to wire housing 300 would hang down when the sliding door 302 is opened. However, because the tube 709 is supported by elastic member 900, hanging down of the 709 may be prevented.

As shown in FIG. 9, tube end 713 is supported elastic member 900. Elastic member 900 is coiled around pin members 715, which are mounted in the sides of u-shaped member 717. U-shaped member 717 is disposed on second rotating portion 711.

According to the exemplary embodiment of the present invention, damage to the wire is prevented and noise can be prevented when the moving wiring system operates.

While this invention has been described in connection with what is presently considered to be the most practical exemplary embodiment, it is to be understood that the invention is not limited to the disclosed embodiment, but, on the contrary, is intended to cover various modifications and equivalent arrangements included within the spirit and scope of the appended claims.

What is claimed is:

1. A moving wiring system transmitting electrical power from a vehicle body of a vehicle to a sliding door of said vehicle, comprising:

a wire transmitting the electrical power and at least partially surrounded by a hollow member at a first portion of the wire;

a wire housing attached to the sliding door, with a second portion of the wire located therein; and a wire guide assembly attached to the vehicle body and guiding the wire, wherein the wire guide assembly comprises:

a first guiding portion attached to the vehicle body and guiding the wire;

a second guiding portion rotatably coupled to the first guiding portion such that a longitudinal axis of said first guiding portion is generally perpendicular to a longitudinal axis of said second guiding portion; and a third guiding portion pivotably attached to an end of the second guiding portion supporting the hollow member, and guiding the wire to the wire housing, wherein the third guiding portion comprises:

a spring biasing the hollow member to pivot about an axis generally perpendicular to said longitudinal axis of said first guiding portion.

2. The system of claim 1, wherein the wire housing defines a space in which the second portion of the wire is movably located.

3. A moving wiring system transmitting electrical power from a vehicle body of a vehicle to a sliding door of said vehicle, comprising:
- a wire transmitting the electrical power;
- a wire housing attached to the sliding door, with at least a portion of the wire located therein; and
- a wire guide assembly attached to the vehicle body and guiding the wire, wherein the wire guide assembly comprises:
- a first guiding portion attached to the vehicle body and guiding the wire;
- a second guiding portion rotatably coupled to the first guiding portion such that a longitudinal axis of said first guiding portion is generally perpendicular to a longitudinal axis of said second guiding portion; and
- a third guiding portion attached to an end of the second guiding portion and guiding the wire to the wire housing, wherein the third guiding portion comprises:
- a tube pivotably attached to the second guiding portion and a spring biasing said tube to pivot about an axis generally perpendicular to said longitudinal axis of said first guiding portion, the tube guiding the wire from the third guiding portion to the wire housing.

4. The system of claim 3, wherein the wire housing defines a space in which said portion of the wire is movably located.

* * * * *